United States Patent
Zhu et al.

(10) Patent No.: US 12,554,604 B2
(45) Date of Patent: Feb. 17, 2026

(54) METADATA RECOVERY METHOD AND APPARATUS FOR RAID CONTROLLER, DEVICE, AND NONVOLATILE READABLE STORAGE MEDIUM

(71) Applicant: Suzhou MetaBrain Intelligent Technology Co., Ltd., Jiangsu (CN)

(72) Inventors: Hongyu Zhu, Jiangsu (CN); Fangjian Xia, Jiangsu (CN)

(73) Assignee: Suzhou MetaBrain Intelligent Technology Co., Ltd., Jiangsu (CN)

( * ) Notice: Subject to any disclaimer, the term of this patent is extended or adjusted under 35 U.S.C. 154(b) by 0 days.

(21) Appl. No.: 18/876,314

(22) PCT Filed: Sep. 25, 2023

(86) PCT No.: PCT/CN2023/121185
§ 371 (c)(1),
(2) Date: Dec. 18, 2024

(87) PCT Pub. No.: WO2024/103967
PCT Pub. Date: May 23, 2024

(65) Prior Publication Data
US 2026/0003751 A1    Jan. 1, 2026

(30) Foreign Application Priority Data
Nov. 16, 2022 (CN) .......................... 202211463228.5

(51) Int. Cl.
G06F 11/20 (2006.01)
(52) U.S. Cl.
CPC ...... G06F 11/2089 (2013.01); G06F 11/2071 (2013.01); G06F 2201/805 (2013.01)
(58) Field of Classification Search
CPC ... G06F 11/20; G06F 11/2089; G06F 11/2071
See application file for complete search history.

(56) References Cited

U.S. PATENT DOCUMENTS 6,643,795 B1 * 11/2003 Sicola ................ G06F 11/2079
714/E11.073
9,021,296 B1 * 4/2015 Kiselev ................ G06F 3/0647
714/6.23

(Continued)

FOREIGN PATENT DOCUMENTS

CN    102681794 A    9/2012
CN    103488435 A    1/2014

(Continued)

OTHER PUBLICATIONS

International Search Report cited in PCT/CN2023/121185, mailed Dec. 21, 2023, 6 pages.

(Continued)

*Primary Examiner* — Kamini B Patel
(74) *Attorney, Agent, or Firm* — Cooper Legal Group, LLC (57) ABSTRACT

Provided are a metadata recovery method and apparatus for a Redundant Array of Independent Disks (RAID) controller, a device, and a nonvolatile readable storage medium. The method includes: setting sorting of each controller in the RAID controller, and setting a backup controller for each controller according to the sorting; selecting a preset number of strips from each controller, numbering each strip, and setting a unique owner controller for numbered strips of each controller; backing up other controllers according to the set backup controller and the unique owner controller for the strips in response to a controller failure; and recovering a controller according to the set backup controller and the unique owner controller for the strips in response to controller recovery.

20 Claims, 3 Drawing Sheets

(56) References Cited

U.S. PATENT DOCUMENTS

| | | | | |
|---|---|---|---|---|
| 9,430,484 | B2* | 8/2016 | Kiselev | G06F 3/067 |
| 9,600,375 | B2* | 3/2017 | Dain | G06F 11/1092 |
| 9,600,383 | B2* | 3/2017 | Mishuku | G06F 11/2071 |
| 10,754,730 | B2* | 8/2020 | Brown | G06F 3/067 |
| 2004/0064639 | A1* | 4/2004 | Sicola | G06F 11/2089 |
| | | | | 711/143 |
| 2010/0332862 | A1* | 12/2010 | Lester | G11C 29/02 |
| | | | | 365/201 |
| 2015/0121131 | A1* | 4/2015 | Kiselev | G06F 11/2023 |
| | | | | 714/6.23 |
| 2016/0004613 | A1* | 1/2016 | Hayes | G06F 11/2058 |
| | | | | 714/6.23 |
| 2016/0342491 | A1* | 11/2016 | Kiselev | G06F 3/0647 |
| 2017/0116096 | A1* | 4/2017 | Keremane | G06F 11/2092 |
| 2017/0116099 | A1* | 4/2017 | Keremane | G06F 3/0619 |
| 2024/0419333 | A1* | 12/2024 | He | G06F 3/0689 |

FOREIGN PATENT DOCUMENTS

| | | |
|---|---|---|
| CN | 114281591 A | 4/2022 |
| CN | 114995771 A | 9/2022 |
| CN | 115129507 A | 9/2022 |
| CN | 115268784 A | 11/2022 |
| CN | 115543692 A | 12/2022 |
| JP | 2009053946 A | 3/2009 |

OTHER PUBLICATIONS

Written Opinion cited in PCT/CN2023/121185, mailed Dec. 21, 2023, 6 pages.

Notification to Grant Patent Right for Invention cited in CN202211463228.5, mailed Mar. 1, 2023, 3 pages.

First Office Action cited in CN202211463228.5, mailed Jan. 12, 2023, 10 pages.

Kai Bu, "Research and Design of Solid-State Storage Array System Based on RAID Technology", (Information & Technology, China Master's Theses Full-Text Database (Monthly), No. 05, May 15, 2010, ISSN: 1674-0246, text pp. 33-46 with English abstract, 67 pages.

* cited by examiner

METADATA RECOVERY METHOD AND APPARATUS FOR RAID CONTROLLER, DEVICE, AND NONVOLATILE READABLE STORAGE MEDIUM

CROSS-REFERENCE TO RELATED APPLICATION

This application claims priority to Chinese Patent Application No. 202211463228.5, filed on Nov. 16, 2022 in China National Intellectual Property Administration and entitled "Metadata Recovery Method and Apparatus for RAID Controller, Device, and Medium", which is incorporated herein by reference in its entirety.

FIELD

The present application relates to the field of computers, in particular, to a metadata recovery method and apparatus for a Redundant Array of Independent Disks (RAID) controller, a device, and a nonvolatile readable storage medium.

BACKGROUND

To maintain high availability of an array so as not to stop a service in case of a hardware failure, hardware redundancy is adopted mostly. Same array operates on two or more nodes. When operating normally, two controllers process different services mutually to ensure operating performance. When a node fails, remaining controllers take over service of the failed controller to ensure that service operation is not stopped. When there are four controllers, three of the controllers are allowed to fail, while the service is not affected.

In a current four-control RAID storage system, there are two mainstream data backup modes: four-control synchronization and dual-control synchronization. Both the four-control synchronization and the dual-control synchronization support failure of three of four controllers except that the four-control synchronization allows three of the four controllers to fail simultaneously, while the dual-control synchronization allows the four controllers to fail in turn and it should be enough synchronization time during the failure to establish a new synchronization relationship. In contrast, the dual-control synchronization provides higher operating efficiency and lower read and write delay.

The main part of data backup is metadata used by a RAID. The RAID has metadata on the four controllers to support formatting, reconstruction, and other features of the RAID. The metadata should be backed up. Here, a four-control cycle mirroring mode is adopted. That is, one of the controllers synchronizes the metadata to a subsequent controller thereto in turn. At the same time, the controllers should reserve space to accommodate all the metadata of the four controllers to ensure that the remaining controller may smoothly take over the metadata when three of the controllers fail.

When a controller fails, the four-control synchronization does not require data replication since there is no need to establish a new synchronization relationship. However, according to the cycle mirroring scheme, data should be replicated to a new node since there is a need to establish a new synchronization relationship. This replication process increases the temporary service temporary suspension time when a controller fails. Such phenomenon also occurs when the controller is recovered.

SUMMARY

In view of this, embodiments of the present application aim to provide a metadata recovery method and apparatus for a RAID controller, a device, and a nonvolatile readable storage medium. By using the technical solution of the present application, the space utilization rate may be increased, the synchronization speed of metadata may be increased, and the impact on time caused by controller service s may be reduced.

Based on the foregoing object, in a first aspect, the present application provides a metadata recovery method for a RAID controller, including following steps:

setting sorting of each controller in the RAID controller, and setting a backup controller for each controller according to the sorting;

selecting a preset number of strips from each controller, numbering each strip, and setting a unique owner controller for numbered strips of each controller;

backing up other controllers according to the set backup controller and the unique owner controller for the strips in response to a controller failure; and recovering a controller according to the set backup controller and the unique owner controller for the strips in response to controller recovery.

According to one embodiment of the present application, the backing up other controllers according to the set backup controller and the unique owner controller for the strips in response to a controller failure includes:

backing up metadata from a previous controller of a failed controller to the backup controller after backing up metadata from the backup controller to a subsequent controller of the backup controller, or backing up metadata from the backup controller into a previous controller of the failed controller after backing up metadata from the previous controller of the failed controller to the backup controller.

According to one embodiment of the present application, the recovering a controller according to the set backup controller and the unique owner controller for the strips in response to controller recovery includes:

copying metadata of the backup controller into a recovered controller.

According to one embodiment of the present application, the setting sorting of each controller in the RAID controller and setting a backup controller for each controller according to the sorting includes:

setting a backup controller of a first controller in a four-control RAID controller as a second controller, setting a backup controller of the second controller as a third controller, setting a backup controller of the third controller as a fourth controller, and setting a backup controller of the fourth controller as the first controller.

According to one embodiment of the present application, the setting sorting of each controller in the RAID controller and setting a backup controller for each controller according to the sorting includes:

in a case that the RAID controller includes M controllers, setting a backup controller of an $m^{th}$ controller as an $(m+1)^{th}$ controller where m is a positive integer greater than or equal to 1 and less than or equal to M−1, and in a case that m+1 is equal to M, setting a backup controller of the (m+1) th controller as a $1^{st}$ controller.

According to one embodiment of the present application, the selecting a preset number of strips from each controller, numbering each strip and setting unique owner controllers for the numbered strips of each controller includes:

selecting 16 strips from each controller, and numbering the strips from each controller in numerical order; and setting a unique owner controller for each of the 16 strips from each controller, where unique owner controllers for the same numbered strips in each controller are same.

According to one embodiment of the present application, the selecting a preset number of strips from each controller, numbering each strip and setting a unique owner controller for the numbered strips of each controller includes:

selecting P strips from each controller, and numbering the strips from each controller in numerical order, where P is a positive integer greater than or equal to 1; and setting a unique owner controller for each of the P strips from each controller, where unique owner controllers for same numbered strips in each controller are same.

According to one embodiment of the present application, P is a positive integer greater than or equal to 16.

According to one embodiment of the present application, the backing up other controllers according to the set backup controller and the unique owner controller for the strips in response to a controller failure includes:

stopping a service after a current task ends in response to a detection that controller n among four controllers fails;

copying metadata of controller n+1 to controller n+2, performing an OR operation with metadata of controller n+2, and covering the metadata of controller n+2 with an operation result;

copying metadata of controller n−1 to controller n+1, performing an OR operation with metadata of controller n+1, and covering the metadata of controller n+1 with an operation result;

performing RAID service recovery.

According to one embodiment of the present application, the method further includes:

scanning, by controller n+1, the metadata, and wiping metadata not owned by controller n+1.

According to one embodiment of the present application, the backing up other controllers according to the set backup controller and the unique owner controller for the strips in response to a controller failure includes:

stopping a service after a current task ends in response to a detection that controller n among three controllers fails;

copying metadata of controller n−1 to controller n+1, performing an OR operation with metadata of controller n+1, and covering the metadata of controller n+1 with an operation result;

copying metadata of controller n+1 to controller n−1, and covering metadata of controller n−1; and performing RAID service recovery.

According to one embodiment of the present application, the recovering a controller according to the set backup controller and the unique owner controller for the strips in response to controller recovery includes:

stopping a service after a current task ends in response to a detection that a fourth controller n is recovered;

copying metadata of controller n+1 to controller n, and covering metadata of controller n; and performing RAID service recovery.

According to one embodiment of the present application, the method further includes:

scanning, by controller n, metadata, and wiping metadata not owned by controller n;

scanning, by controller n+1, metadata, and wiping metadata not owned by controller n+1.

According to one embodiment of the present application, the recovering a controller according to the set backup controller and the unique owner controller for the strips in response to controller recovery includes:

stopping a service after a current task ends in response to a detection that a third controller n is recovered;

copying metadata of controller n+1 to controller n, and covering metadata of controller n; and performing RAID service recovery.

According to one embodiment of the present application, the method further includes:

scanning, by controller n, metadata, and wiping metadata not owned by controller n;

scanning, by controller n+1, metadata, and wiping metadata not owned by controller n+1; and scanning, by controller n+2, metadata, and wiping metadata not owned by controller n+2.

According to one embodiment of the present application, before the setting sorting of each controller in the RAID controller and setting a backup controller for each controller according to the sorting, the method further includes:

wiping metadata not owned by a controller in each controller.

According to one embodiment of the present application, the wiping metadata not owned by the controller in each controller includes:

stopping a service in response to a current task of a controller ending;

copying configuration metadata of each controller to describe a task to be performed, so as to divide a full configuration per unit length;

scanning full metadata of each controller, and wiping metadata not owned by the controller and a completed state; and performing RAID service recovery after scan is completed.

In a second aspect, there is also provided a metadata recovery apparatus for a RAID controller. The apparatus includes:

a setting module, configured for setting sorting of each controller in the RAID controller, and setting a backup controller for each controller according to the sorting;

a numbering module, configured for selecting a preset number of strips from each controller, numbering each strip, and setting a unique owner controller for numbered strips of each controller;

a backup module, configured for backing up other controllers according to the set backup controller and the unique owner controller for the strips in response to a controller failure; and a recovery module, configured for recovering a controller according to the set backup controller and the unique owner controller for the strips in response to controller recovery.

In a third aspect, there is also provided a computer device. The computer device includes:

at least one processor; and a memory, storing computer instructions executable on the processor, where the instructions, when executed by the processor, implement the steps of any of the foregoing methods.

In a fourth aspect, there is also provided a nonvolatile readable storage medium. The nonvolatile readable storage medium stores a computer program. The computer program, when executed by a processor, implements the steps of any of the foregoing methods.

The present application has the following beneficial technical effects. In the metadata recovery method for a RAID controller provided by the embodiments of the present application, sorting of each controller in the RAID controller is set, and a backup controller for each controller is set according to the sorting; a preset number of strips are selected from each controller, each strip is numbered, and unique owner controllers for the numbered strips of each controller is set; other controllers are backed up according to the set backup controller and the unique owner controller for the strip in response to a controller failure; and a controller is recovered according to the set backup controller and the unique owner controller for the strip in response to controller recovery. By using this technical solution, the space utilization rate may be increased, the synchronization speed of metadata may be increased, and the impact on time caused by controller service suspension may be reduced.

BRIEF DESCRIPTION OF THE DRAWINGS

To more clearly explain the technical solutions in the embodiments of the present application or the related art, the accompanying drawings to be used in the description of the embodiments or the related art will be briefly introduced below. It is obvious that the accompanying drawings in the following description are some embodiments of the present application, and other embodiments may be obtained from the accompanying drawings without making creative labor for those of ordinary skill in the art.

DETAILED DESCRIPTION

In order to make the object, technical solution, and advantages of the present application more clearly understood, embodiments of the present application will be described in detail below in conjunction with embodiments and with reference to the accompanying drawings.

Figure 1:
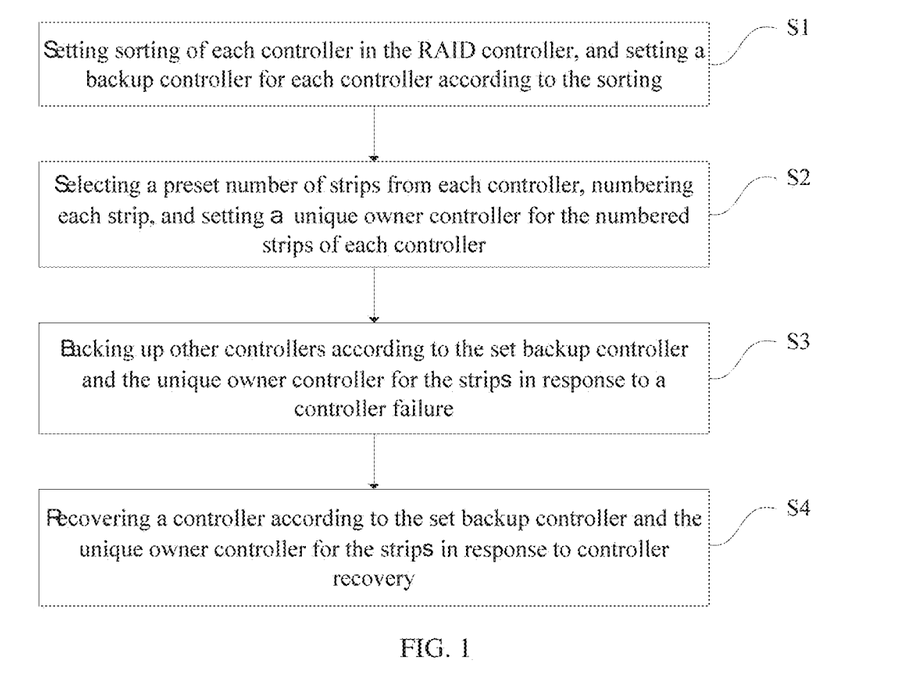
FIG. 1 is a schematic flowchart of a metadata recovery method for a RAID controller according to one or more embodiments of the present application.

Based on the foregoing object, in a first aspect of embodiments of the present application, one embodiment of a metadata recovery method for a RAID controller is provided. FIG. 1 shows a schematic flowchart of the method.

Figure 2:
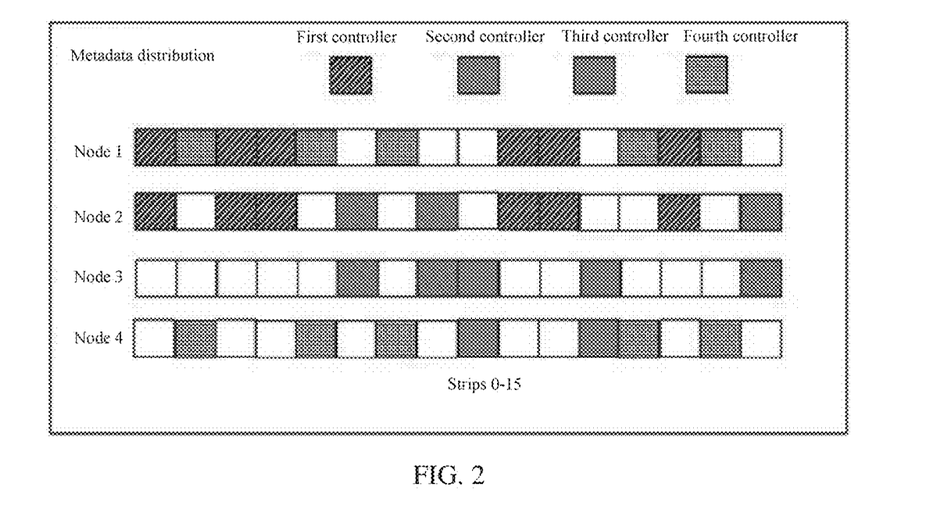
FIG. 2 is a schematic diagram of a metadata spatial layout of a RAID according to one or more embodiments of the present application.

As shown in FIG. 1, the method may include the following steps:

S1: Setting sorting of each controller in the RAID controller, and setting a backup controller for each controller according to the sorting. The present application is mainly used in a four-control RAID system controller, and may also be used in a system including more controllers. As shown in FIG. 2, it is determined that node(n) is used for identifying an $n^{th}$ controller and node(n+1) is used for identifying a subsequent controller to the controller. For example, in a case of four-control, a subsequent controller to node4 is node1, and in case of three-control (node1 is offline), a subsequent controller to node4 is node2. node(n−1) is determined in the same way.

S2: Selecting a preset number of strips from each controller, numbering each strip, and setting a unique owner controller for numbered strips of each controller. As shown in FIG. 2, four types of grids are determined. The four types of grids are owned by four controllers from left to right, respectively. A metadata spatial layout diagram for a RAID is provided. As shown, the four types of grids describe strips owned by four controllers, respectively. A strip owned by a controller will be read and written on the controller owning the strip. It is determined that do is owned by node1 (controller 1, first controller), and so on, where a backup node for metadata of a strip owned by node1 is node2, and so on. A backup node of node4 is node1.

Figure 3:
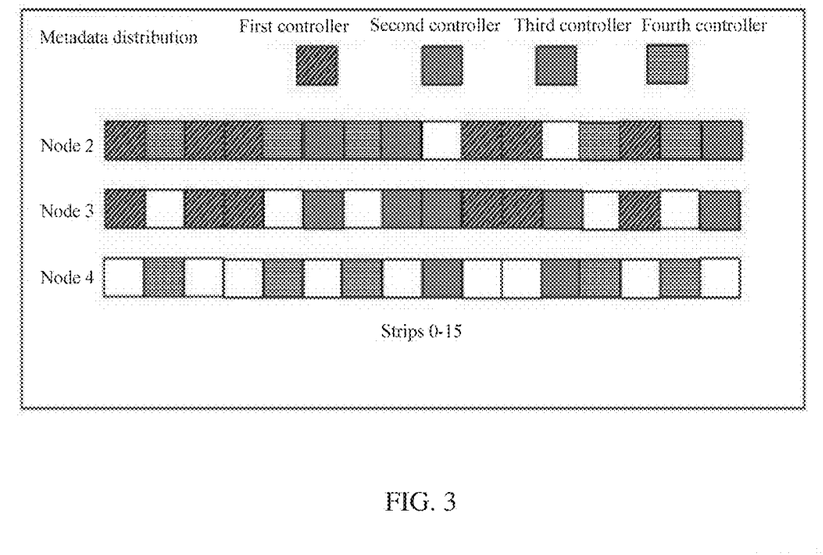
FIG. 3 is a schematic diagram of a metadata spatial layout after a control failure in a RAID according to one or more embodiments of the present application.

S3: Backing up other controllers according to the set backup controller and the unique owner controller for the strips in response to a controller failure. When a controller fails, strips owned by the controller are migrated to and owned by a controller+1. For example, when the controller node1 fails, strips (left slashes as shown in the figure) owned by node1 will be migrated to and owned by node2. At the same time, metadata backed up on the controller will be backed up to the controller+1. For example, when the controller node1 fails, metadata (grids as shown in the figure) backed up on node1 will be re-backed up to node2. That is, a backup node of node4 is changed to node2, as shown in FIG. 3.

S4: Recovering a controller according to the set backup controller and the unique owner controller for the strips in response to controller recovery.

By using the technical solution of the present application, the space utilization rate may be increased, the synchronization speed of metadata may be increased, and the impact on time caused by controller service suspension may be reduced.

In one or more embodiments of the present application, the setting sorting of each controller in the RAID controller and setting a backup controller for each controller according to the sorting includes:

setting a backup controller of a first controller in a four-control RAID controller as a second controller, setting a backup controller of the second controller as a third controller, setting a backup controller of the third controller as a fourth controller, and setting a backup controller of the fourth controller as the first controller. If there are more controllers, a backup controller of the last controller is the first controller. The backup controller of each controller may be arranged orderly. When a controller needs to be backed up, the backup controller thereof may be easily found.

In one or more embodiments of the present application, the selecting a preset number of strips from each controller, numbering each strip and setting a unique owner controller for numbered strips of each controller includes:

selecting 16 strips from each controller, and numbering the strips from each controller in numerical order; and setting a unique owner controller for each of the 16 strips from each controller, where unique owner controllers for same numbered strips in each controller are same. More strips may be selected as required. Each controller has the same number of strips, and the unique owner controllers for the same numbered strips in the respective controllers are the same, whereby strips owned by a controller may be read and written on the controller owning the strips, thereby realizing the effective distribution of data. When the controller fails, the synchronization speed of metadata is increased, and the impact on time caused by controller service suspension is reduced.

In one or more embodiments of the present application, the backing up other controllers according to the set backup controller and the unique owner controller for the strips in response to a controller failure includes:

stopping a service after a current task ends in response to a detection that controller n among four controllers fails; copying metadata of controller n+1 to controller n+2, performing an OR operation with metadata of controller n+2, and covering the metadata of controller n+2 with an operation result; copying metadata of controller n−1 to controller n+1, performing an OR operation with metadata of controller n+1, and covering the metadata of controller n+1 with an operation result; performing RAID service recovery.

By determining a backup relationship of the backup controller, there is no need to calculate an ownership relationship of the controller when data needs to be merged in case of a controller failure, thereby realizing the memory-level copy merge, increasing the data merge speed, and reducing the impact on controller service suspension.

In one or more embodiments of the present application, the method further includes: scanning, by controller n+1, the metadata, and wiping the metadata not owned by controller n+1. When the controller fails, RAID metadata of the controller is resynchronized. That is, as described above, the strips owned by the controller are migrated to and owned by the controller +1, and metadata backed up on the controller will be backed up to the controller +1. This process is a process of backing up when one of four controllers fails.

In one or more embodiments of the present application, the backing up other controllers according to the set backup controller and the unique owner controller for the strips in response to a controller failure includes:

stopping a service after a current task ends in response to a detection that controller n among three controllers fails; copying metadata of controller n−1 to controller n+1, performing an OR operation with metadata of controller n+1, and covering the metadata of controller n+1 with an operation result; copying metadata of controller n+1 to controller n−1, and covering metadata of controller n−1; and performing RAID service recovery.

This process is a process of backing up when one of three controllers fails. By determining a backup relationship of the backup controller, there is no need to calculate an ownership relationship of the controller when data needs to be merged in case of a controller failure, thereby realizing the memory-level copy merge and increasing the data merge speed.

In one or more embodiments of the present application, the recovering a controller according to the set backup controller and the unique owner controller for the strips in response to controller recovery includes:

stopping a service after a current task ends in response to detecting that a fourth controller n is recovered; copying metadata of controller n+1 to controller n, and covering metadata of controller n; and performing RAID service recovery.

After the controller is recovered, data of the controller may be quickly recovered according to the owner relationship of the backup controller.

In one or more embodiments of the present application, the method further includes:

scanning, by controller n, the metadata, and wiping the metadata not owned by controller n; scanning, by controller n+1, the metadata, and wiping the metadata not owned by controller n+1.

When the controller is recovered, RAID metadata of the controller is resynchronized, and a service originally owned by the controller and now taken over by other controllers will be recovered to the controller. This process is a process of recovering three controllers into four controllers, while the metadata needs to be wiped at the same time, whereby data not belonging to the controller may be deleted, thereby improving the utilization rate of storage space.

In one or more embodiments of the present application, the recovering a controller according to the set backup controller and the unique owner controller for the strips in response to controller recovery includes:

stopping a service after a current task ends in response to a detection that a third controller n is recovered; copying metadata of controller n+1 to controller n, and covering metadata of controller n; and performing RAID service recovery. After the controller is recovered, data of the controller may be quickly recovered according to the owner relationship of the backup controller.

In one or more embodiments of the present application, the method further includes:

scanning, by controller n, metadata, and wiping metadata not owned by controller n; scanning, by controller n+1, metadata, and wiping metadata not owned by controller n+1; and scanning, by controller n+2, metadata, and wiping metadata not owned by controller n+2.

This process is a process of recovering two controllers into three controllers, while the metadata needs to be wiped at the same time, whereby data not belonging to the controller may be deleted, thereby improving the utilization rate of storage space.

In one or more embodiments of the present application, before the setting sorting of each controller in the RAID controller and setting a backup controller for each controller according to the sorting, the method further includes: wiping metadata not owned by a controller in each controller.

In one or more embodiments of the present application, the wiping metadata not owned by a controller in each controller includes:

stopping a service in response to a current task of the controller ending; copying configuration metadata of each controller to describe a task to be performed, so as to divide a full configuration per unit length; scanning full metadata of each controller, and wiping metadata not owned by the controller and a completed state; and performing RAID service recovery after scan is completed.

The foregoing algorithm in case of the controller failure and recovery should be used in conjunction with initial configuration of metadata. That is, metadata space is first distributed as described above, and the initial configuration should be performed according to a controller ownership when the metadata is initially used. This is because the controller ownership issue will no longer be considered in the memory copy merge algorithm executed in case of the controller failure and recovery. The initial configuration of the controller ownership means that when a RAID module enables controller metadata, the RAID needs to equate metadata not owned by the controller and a completed state of the metadata. For example, metadata is used for formatting. It is determined that the formatting is completed by bit0 (bit) description and required by bit1 description. Then the controller needs to complete the formatting by bit0 description of a set bit not owned by the controller. When RAID metadata is enabled (configured at the start of a task used), the foregoing logic needs to be executed simultaneously for controllers currently present in the four-control system. When the controller fails in the process, the metadata enables a configuration algorithm, and execution is restarted according to a new ownership assignment of the available controller.

By using the technical solution of the present application, the space utilization rate may be increased, the synchronization speed of metadata may be increased, and the impact on time caused by controller service suspension may be reduced.

It should be noted that those of ordinary skill in the art may understand that all or part of the procedures in the methods of the foregoing embodiments may be completed by instructing related hardware through a computer program. The program may be stored in a computer-readable storage medium. The program, when executed, may include the procedures of the various method embodiments. The storage medium may be a magnetic disc, an optical disc, a Read Only Memory (ROM), a Random Access Memory (RAM), or the like. The foregoing embodiments of the computer program may achieve the same or similar effects as any of the corresponding foregoing method embodiments.

Furthermore, the method disclosed according to the embodiments of the present application may be further implemented as a computer program executed by a Central Processing Unit (CPU). The computer program may be stored in a nonvolatile readable storage medium. When the computer program is executed by the CPU, the foregoing functions defined in the method disclosed according to the embodiments of the present application are performed.

Figure 4:
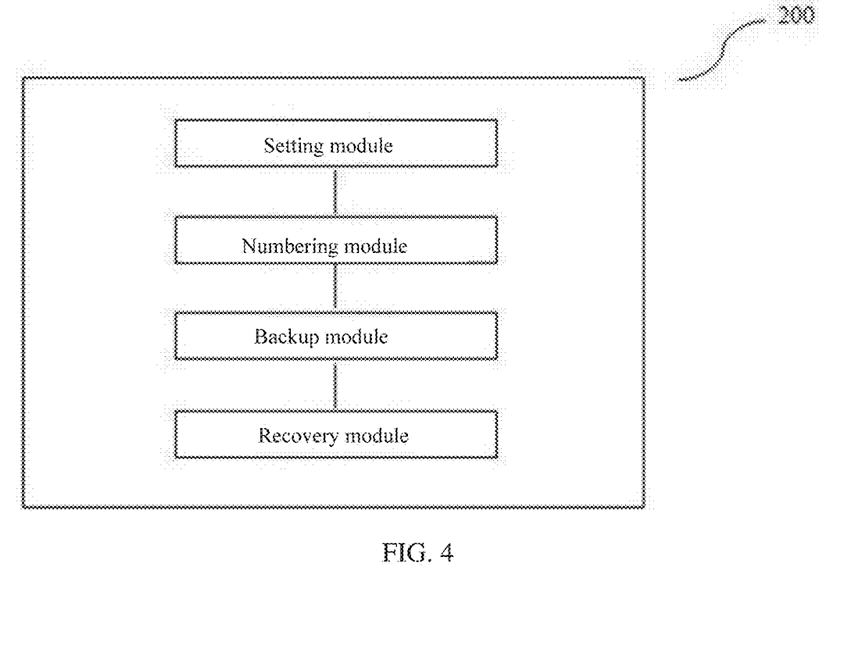
FIG. 4 is a schematic diagram of a metadata recovery apparatus for a RAID controller according to one or more embodiments of the present application.

Based on the foregoing object, in a second aspect of embodiments of the present application, a metadata recovery apparatus for a RAID controller is provided. As shown in FIG. 4, the apparatus 200 includes:

a setting module, configured for setting sorting of each controller in the RAID controller, and setting a backup controller for each controller according to the sorting; a numbering module, configured for selecting a preset number of strips from each controller, numbering each strip, and setting a unique owner controller for numbered strips of each controller; a backup module, configured for backing up other controllers according to the set backup controller and the unique owner controller for the strips in response to a controller failure; and a recovery module, configured for recovering a controller according to the set backup controller and the unique owner controller for the strips in response to controller recovery.

Figure 5:
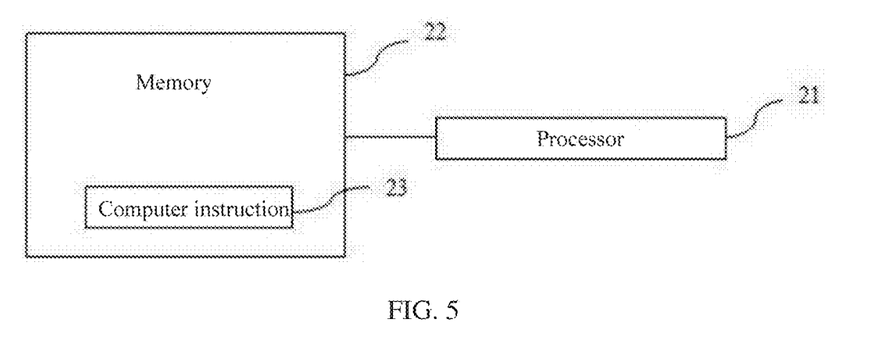
FIG. 5 is a schematic diagram of a computer device according to one or more embodiments of the present application.

Based on the foregoing object, in a third aspect of embodiments of the present application, a computer device is provided. FIG. 5 shows a schematic diagram of embodiments of a computer device provided by the present application. As shown in FIG. 5, according to the embodiments of the present application, the computer device includes: at least one processor 21 and a memory 22. The memory 22 stores computer instructions 23 executable on the processor. The instructions, when executed by the processor, implement the method including the following steps:

setting sorting of each controller in the RAID controller, and setting a backup controller for each controller according to the sorting; selecting a preset number of strips from each controller, numbering each strip, and setting a unique owner controller for numbered strips of each controller; backing up other controllers according to the set backup controller and the unique owner controller for the strips in response to a controller failure; and recovering a controller according to the set backup controller and the unique owner controller for the strips in response to controller recovery.

In one or more embodiments of the present application, the setting sorting of each controller in the RAID controller and setting a backup controller for each controller according to the sorting includes:

setting a backup controller of a first controller in a four-control RAID controller as a second controller, setting a backup controller of the second controller as a third controller, setting a backup controller of the third controller as a fourth controller, and setting a backup controller of the fourth controller as the first controller.

In one or more embodiments of the present application, the selecting a preset number of strips from each controller, numbering each strip and setting a unique owner controller for the numbered strips of each controller includes:

selecting 16 strips from each controller, and numbering the strips from each controller in numerical order; and setting a unique owner controller for each of the 16 strips from each controller, where the unique owner controllers for the same numbered strips in each controller are same.

In one or more embodiments of the present application, the backing up other controllers according to the set backup controller and the unique owner controller for the strips in response to a controller failure includes:

stopping a service after a current task ends in response to detecting that controller n among four controllers fails; copying metadata of controller n+1 to controller n+2, performing an OR operation with metadata of controller n+2, and covering the metadata of controller n+2 with an operation result; copying metadata of controller n−1 to controller n+1, performing an OR operation with metadata of controller n+1, and covering the metadata of controller n+1 with an operation result; performing RAID service recovery.

In one or more embodiments of the present application, the method further includes: scanning, by controller n+1, the metadata, and wiping the metadata not owned by controller n+1.

In one or more embodiments of the present application, the backing up other controllers according to the set backup controller and the unique owner controller for the strip in response to a controller failure includes:

stopping a service after a current task ends in response to a detection that controller n among three controllers fails; copying metadata of controller n−1 to controller n+1, performing an OR operation with metadata of controller n+1, and covering the metadata of controller n+1 with an operation result; copying metadata of controller n+1 to controller n−1, and covering metadata of controller n−1; and performing RAID service recovery.

In one or more embodiments of the present application, the recovering a controller according to the set backup controller and the unique owner controller for the strips in response to controller recovery includes:

stopping a service after a current task ends in response to detecting that a fourth controller n is recovered; copying metadata of controller n+1 to controller n, and covering metadata of controller n; and performing RAID service recovery.

In one or more embodiments of the present application, the method further includes: scanning, by controller n, metadata, and wiping metadata not owned by controller n; scanning, by controller n+1, metadata, and the metadata not owned by controller n+1.

In one or more embodiments of the present application, the recovering a controller according to the set backup controller and the unique owner controller for the strips in response to controller recovery includes:

stopping a service after a current task ends in response to detecting that a third controller n is recovered; copying metadata of controller n+1 to controller n, and covering metadata of controller n; and performing RAID service recovery.

In one or more embodiments of the present application, the method further includes: scanning, by controller n, metadata, and wiping metadata not owned by controller n; scanning, by controller n+1, metadata, and wiping metadata not owned by controller n+1; and scanning, by controller n+2, the metadata, and wiping the metadata not owned by controller n+2.

In one or more embodiments of the present application, before the setting sorting of each controller in the RAID controller and setting a backup controller for each controller according to the sorting, the method further includes: wiping metadata not owned by a controller in each controller.

In one or more embodiments of the present application, the wiping metadata not owned by a controller in each controller includes: stopping a service in response to a current task of the controller ending; copying configuration metadata of each controller to describe a task to be performed, so as to divide a full configuration per unit length; scanning full metadata of each controller, and wiping metadata not owned by the controller and a completed state; and performing RAID service recovery after scan is completed.

Figure 6:
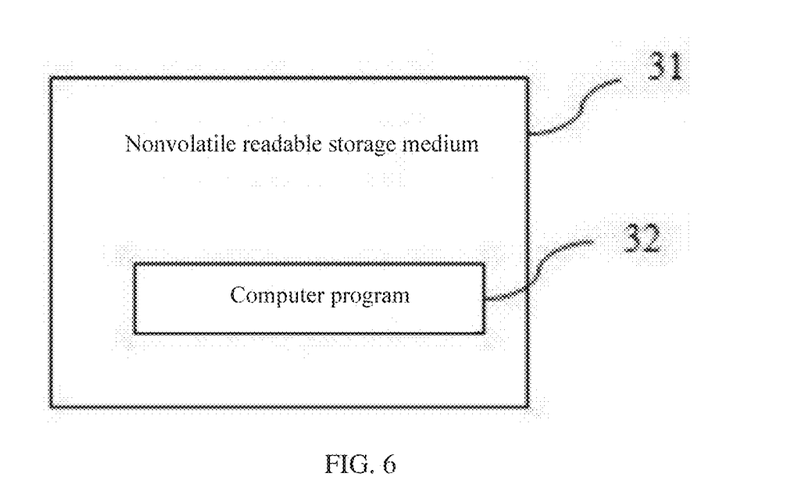
FIG. 6 is a schematic diagram of a nonvolatile readable storage medium according to one or more embodiments of the present application.

Based on the foregoing object, in a fourth aspect of embodiments of the present application, a nonvolatile readable storage medium is provided. FIG. 6 is a schematic diagram of embodiments of a nonvolatile readable storage medium provided by the present application. As shown in FIG. 6, the nonvolatile readable storage medium 31 stores a computer program 32 which, when executed by a processor, performs the above method.

Furthermore, the method disclosed according to the embodiments of the present application may be further implemented as a computer program executed by the processor. The computer program may be stored in the nonvolatile readable storage medium. When the computer program is executed by the processor, the foregoing functions defined in the method disclosed according to the embodiments of the present application are performed.

Furthermore, the foregoing method steps and system units may also be implemented with a controller and a nonvolatile readable storage medium configured for storing a computer program that causes the controller to implement the functions of the foregoing steps or units.

Those skilled in the art will also appreciate that various exemplary logic blocks, modules, circuits, and algorithmic steps described in connection with the disclosure herein may be implemented as electronic hardware, computer software, or a combination thereof. To clearly illustrate this interchangeability of hardware and software, various illustrative components, blocks, modules, circuits, and steps have been described generally in terms of their functionality. Whether such functionality is implemented as software or hardware depends on applications and design constraints imposed on the overall system. Those skilled in the art may implement the functionality in various ways for each application, but such implementation decisions should not be construed as causing a departure from the scope of disclosure of the embodiments of the present application.

In one or more exemplary designs, the functionality may be implemented in hardware, software, firmware, or any combination thereof. If implemented in software, the functionality may be stored on or transmitted through a nonvolatile readable storage medium as one or more instructions or codes. The nonvolatile readable storage medium includes a computer storage medium and a communication medium. The communication medium includes any medium that facilitates the transmission of a computer program from one location to another. The storage medium may be any available medium that may be accessed by a general-purpose or special-purpose computer. By way of example and not limitation, the nonvolatile readable storage medium may include a RAM, a ROM, an Electrically Erasable Programmable Read-Only Memory (EEPROM), a Compact Disc Read-Only Memory (CD-ROM), or other optical disc storage device, magnetic disc storage device, or other magnetic storage device, or any other medium that may be configured for carrying or storing desired program codes in the form of instructions or data structures and accessible by a general-purpose or special-purpose computer or a general-purpose or special-purpose processor. Furthermore, any connection may suitably be referred to as the nonvolatile readable storage medium. For example, if a coaxial cable, a fiber optic cable, a twisted pair, a Digital Subscriber Line (DSL), or wireless technologies such as infrared, radio, and microwave are used for sending software from websites, servers, or other remote sources, the foregoing coaxial cable, fiber optic cable, twisted pair, DSL, or wireless technologies such as infrared, radio, and microwave are all included in the definition of medium. As used herein, magnetic and optical discs include a Compact Disc (CD), a laser disc, an optical disc, a Digital Versatile Disc (DVD), a floppy disc, and a Blu-ray disc, where the magnetic disc typically reproduces data magnetically, while the optical disc reproduces data optically using lasers. Combinations of the foregoing should also be included within the scope of the nonvolatile readable storage medium.

The above are exemplary embodiments disclosed in the present application, but it should be noted that various changes and modifications may be made without departing from the scope disclosed in the embodiments of the present application defined by the claims. The functions, steps, and/or actions of the method claims according to the disclosed embodiments described herein need not be performed in any particular order. Furthermore, although the elements disclosed in the embodiments of the present application may be described or claimed in individual forms, the elements may be understood to be plural unless expressly limited to singular.

It should be understood that, as used herein, the singular form "one" is intended to include the plural form as well unless the context clearly supports an exception. It should also be understood that "and/or" as used herein refers to any and all possible combinations including one or more of the items listed in association.

The serial numbers of the embodiments disclosed above in the embodiments of the present application are for the purpose of description, and do not represent the advantages and disadvantages of the embodiments.

Those of ordinary skill in the art will understand that all or part of the steps for implementing the foregoing embodiments may be completed by hardware, or may be completed by instructing related hardware through a program. The program may be stored in a nonvolatile readable storage medium. The above-mentioned storage medium may be a read-only memory, a magnetic disc, an optical disc, or the like.

Those of ordinary skill in the art will understand that the discussion of any of the above embodiments is merely exemplary and is not intended to imply that the scope of disclosure of the embodiments of the present application (including the claims) is limited to these examples. Under the idea of the embodiments of the present application, the technical features of the above embodiments or different embodiments may also be combined, and there are many other changes in different aspects of the embodiments of the present application as described above, which are not provided in detail for the sake of simplicity. Therefore, any omission, modification, equivalent substitution, improvement, etc. made within the spirit and principles of the embodiments of the present application should be included within the scope of protection of the embodiments of the present application.

The invention claimed is:

1. A metadata recovery method for a Redundant Array of Independent Disks (RAID) controller, comprising following steps:
setting sorting of each controller in the RAID controller, and setting a backup controller for each controller according to the sorting;
selecting a preset number of strips from each controller, numbering each strip, and setting a unique owner controller for numbered strips of each controller;
backing up other controllers according to the backup controller and the unique owner controller for the numbered strips in response to a controller failure; and
recovering a controller according to the backup controller and the unique owner controller for the numbered strips in response to controller recovery;
wherein the backing up other controllers according to the backup controller and the unique owner controller for the numbered strips in response to a controller failure comprises:
backing up metadata from a previous controller of a failed controller to the backup controller after backing up metadata from the backup controller to a subsequent controller of the backup controller, or
backing up the metadata from the backup controller to the previous controller of the failed controller after backing up the metadata from the previous controller of the failed controller to the backup controller.

2. The method according to claim 1, wherein the recovering a controller according to the backup controller and the unique owner controller for the numbered strips in response to controller recovery comprises:
copying metadata of the backup controller into a recovered controller.

3. The method according to claim 1, wherein the setting sorting of each controller in the RAID controller and setting a backup controller for each controller according to the sorting comprises:
setting a backup controller of a first controller in a four-control RAID controller as a second controller, setting a backup controller of the second controller as a third controller, setting a backup controller of the third controller as a fourth controller, and setting a backup controller of the fourth controller as the first controller.

4. The method according to claim 1, wherein the setting sorting of each controller in the RAID controller and setting a backup controller for each controller according to the sorting comprises:
in a case that the RAID controller comprises M controllers, setting a backup controller of an $m^{th}$ controller as an $(m+1)^{th}$ controller, wherein m is a positive integer greater than or equal to 1 and less than or equal to M−1, and
in a case that m+1 is equal to M, setting a backup controller of the $(m+1)^{th}$ controller as a $1^{st}$ controller.

5. The method according to claim 1, wherein the selecting a preset number of strips from each controller, numbering each strip, and setting a unique owner controller for numbered strips of each controller comprises:
selecting 16 strips from each controller, and numbering the strips from each controller in numerical order; and
setting a unique owner controller for each of the 16 strips from each controller, wherein unique owner controllers for a same numbered strips in each controller are same.

6. The method according to claim 1, wherein the selecting a preset number of strips from each controller, numbering each strip, and setting a unique owner controller for numbered strips of each controller comprises:
selecting P strips from each controller, and numbering the P strips from each controller in numerical order, wherein P is a positive integer greater than or equal to 1; and
setting a unique owner controller for each of the P strips from each controller, wherein unique owner controllers for a same numbered strips in each controller are same.

7. The method according to claim 6, wherein P is a positive integer greater than or equal to 16.

8. The method according to claim 1, wherein the backing up other controllers according to the set backup controller and the unique owner controller for the numbered strips in response to a controller failure comprises:
stopping a service after a current task ends in response to a detection that controller n among four controllers fails;
copying metadata of controller n+1 to controller n+2, performing an OR operation with metadata of the controller n+2, and covering the metadata of the controller n+2 with a first operation result;
copying metadata of controller n−1 to the controller n+1, performing an OR operation with metadata of the controller n+1, and covering the metadata of the controller n+1 with a second operation result; and
performing RAID service recovery.

9. The method according to claim 8, further comprising:
scanning, by the controller n+1, additional metadata, and wiping metadata of the additional metadata not owned by the controller n+1.

10. The method according to claim 1, wherein the backing up other controllers according to the set backup controller and the unique owner controller for the numbered strips in response to a controller failure comprises:
stopping a service after a current task ends in response to a detection that controller n among three controllers fails;
copying metadata of controller n−1 to controller n+1, performing an OR operation with metadata of the controller n+1, and covering the metadata of the controller n+1 with an operation result;

copying the metadata of the controller n+1 to the controller n−1, and covering the metadata of the controller n−1; and performing RAID service recovery.

11. The method according to claim 1, wherein the recovering a controller according to the backup controller and the unique owner controller for the numbered strips in response to controller recovery comprises:

stopping a service after a current task ends in response to a detection that a fourth controller n is recovered;

copying metadata of controller n+1 to the fourth controller n, and covering metadata of the fourth controller n; and performing RAID service recovery.

12. The method according to claim 11, further comprising:

scanning, by the fourth controller n, first metadata, and wiping metadata of the first metadata not owned by the fourth controller n;

scanning, by the controller n+1, second metadata, and wiping metadata of the second metadata not owned by the controller n+1.

13. The method according to claim 1, wherein the recovering a controller according to the backup controller and the unique owner controller for the numbered strips in response to controller recovery comprises:

stopping a service after a current task ends in response to a detection that a third controller n is recovered;

copying metadata of controller n+1 to the third controller n, and covering metadata of the third controller n; and performing RAID service recovery.

14. The method according to claim 13, further comprising:

scanning, by the third controller n, first metadata, and wiping metadata of the first metadata not owned by the third controller n;

scanning, by the controller n+1, second metadata, and wiping metadata of the second metadata not owned by the controller n+1; and scanning, by controller n+2, third metadata, and wiping metadata of the third metadata not owned by the controller n+2.

15. The method according to claim 1, wherein before the setting sorting of each controller in the RAID controller and setting a backup controller for each controller according to the sorting, the method further comprises:

wiping metadata not owned by a controller in each controller.

16. The method according to claim 15, wherein the wiping metadata not owned by a controller in each controller comprises:

stopping a service in response to a current task of a controller ending;

copying configuration metadata of each controller to describe a task to be performed, so as to divide a full configuration per unit length;

scanning full metadata of each controller, and wiping metadata not owned by the controller and a completed state; and performing RAID service recovery after scan is completed.

17. The method according to claim 1, wherein the method is used in a system comprising at least four controllers.

18. The method according to claim 1, wherein the numbered strips of each controller are read and written on a corresponding unique owner controller.

19. A computer device, comprising:

at least one processor; and a memory, storing computer-readable instructions executable on the at least one processor, the computer-readable instructions, when executed by the at least one processor, implementing steps of:

setting sorting of each controller in a Redundant Array of Independent Disks (RAID) controller, and setting a backup controller for each controller according to the sorting;

selecting a preset number of strips from each controller, numbering each strip, and setting a unique owner controller for numbered strips of each controller;

backing up other controllers according to the backup controller and the unique owner controller for the numbered strips in response to a controller failure; and recovering a controller according to the backup controller and the unique owner controller for the numbered strips in response to controller recovery.

20. A nonvolatile readable storage medium, storing a computer program, wherein the computer program, when executed by a processor, implements steps of:

setting sorting of each controller in a Redundant Array of Independent Disks (RAID) controller, and setting a backup controller for each controller according to the sorting;

selecting a preset number of strips from each controller, numbering each strip, and setting a unique owner controller for numbered strips of each controller;

backing up other controllers according to the backup controller and the unique owner controller for the numbered strips in response to a controller failure; and recovering a controller according to the backup controller and the unique owner controller for the numbered strips in response to controller recovery.

* * * * *